US006370263B1

(12) United States Patent
Hiratsuka et al.

(10) Patent No.: US 6,370,263 B1
(45) Date of Patent: Apr. 9, 2002

(54) METHOD AND DEVICE FOR REGISTERING AND COLLATING PALM IMPRINTS

(75) Inventors: Seiichi Hiratsuka; Teruhito Amanai; Yoshifumi Yamada, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/229,750

(22) Filed: Jan. 14, 1999

(30) Foreign Application Priority Data

Jan. 14, 1998  (JP) ............................................ 10-005832

(51) Int. Cl.[7] .............................. G06K 9/36; G06K 9/50; G06K 9/80
(52) U.S. Cl. ........................................ 382/115; 382/173
(58) Field of Search ........................... 382/115, 124–127, 382/173, 201, 217, 218; 348/156, 161; 340/5.53, 5.83; 713/186; 902/3, 6; 356/71; 421/1; 434/155

(56) References Cited

U.S. PATENT DOCUMENTS

| 4,186,378 | A | | 1/1980 | Moulton | ............... | 340/146.3 E |
| 4,646,352 | A | * | 2/1987 | Asai et al. | ...................... | 382/5 |
| 5,067,162 | A | * | 11/1991 | Driscoll, Jr. et al. | ............ | 382/5 |
| 5,073,949 | A | | 12/1991 | Takeda et al. | .................. | 382/2 |
| 5,526,436 | A | * | 6/1996 | Sekiya | ........................ | 382/115 |
| 5,528,355 | A | | 6/1996 | Maase et al. | .................. | 356/71 |

FOREIGN PATENT DOCUMENTS

| JP | 52-142945 | 11/1977 |
| JP | 63-145529 | 6/1988 |
| JP | 3-71375 | 3/1991 |
| JP | 3-217984 | 9/1991 |
| JP | 7-21366 | 1/1995 |
| JP | 7-114640 | 5/1995 |
| JP | 8-129643 | 5/1996 |
| WO | WO 95/33242 | 12/1995 |

* cited by examiner

*Primary Examiner*—Leo Boudreau
*Assistant Examiner*—Brian P. Werner
(74) *Attorney, Agent, or Firm*—Foley & Lardner (57) ABSTRACT

There is disclosed a method of registering palm imprints of individuals to be identified to authenticate the individuals. Each palm imprint is divided into parts having regions with predetermined positions and sizes. Feature points are extracted from the parts of the imprint. The obtained feature information is registered as information for identity of individuals.

20 Claims, 8 Drawing Sheets

FIG. 9

METHOD AND DEVICE FOR REGISTERING AND COLLATING PALM IMPRINTS

BACKGROUND OF THE INVENTION

The present invention relates to a method and device for registering and collating palm imprints of individual person who is to be identified for the personal authentication and, more particularly, to a method and a device capable of registering and collating palm imprints in a reduced time with simple means.

As is publicly known, fingerprint is the most popular physical information used in identifying the individual for his personal authentication. The fingerprints exhibit unique characteristics such as branching lines and end points. They differ among individual persons and do not vary throughout the life. Accordingly, disclosure has been made for a great number of devices and systems using the fingerprints or palm prints for the personal authentication. Furthermore, disclosure has been made for the devices utilizing palm prints to shorten the processing time and to improve the reliability.

For example, Japanese Unexamined Patent Publication (JP-A) No. 217984/1991, entitled "Fingerprint Collating device", discloses a technique of shortening the fingerprint collating process. In this prior art, the device has the limited scanning range upon collating the fingerprint. Specifically, palm print images are preliminarily input into the collating device and then specified about which class the input palm print image belong to be classified. The fingerprint data are searched based on the palm print image class, and the input data and the database are sought for the matching data.

In the above-described fingerprint collating device, palm shapes are used in classifying the fingerprints to shorten the collating time used for authentication utilizing fingerprints. This device does not employ personal authentication making use of the palm prints so that the authentication accuracy is not good.

A technique for registering and collating palm prints is described, for example, in Japanese Unexamined Patent Publication (JP-A) No. 114640/1995, entitled "Personal Authentication System". This authentication system extracts information characterizing the palm prints from a plurality of predetermined portions of each palm print and stores the extracted information. The collating process is carried out based on the stored data. The predetermined portions are determined based on the position of the middle finger and have characteristic palm print portions involving less positional errors. These predetermined portions are thinly extracted portions.

During authentication, features are extracted only from a few portions of the numerous portions described above. This improves the authentication speed. However, no mention is made about the means for selecting the above-mentioned few portions.

The aforementioned personal authentication system needs complex equipment including a prism, guide members, and a light source. These components are used to establish the positions where the few portions are extracted. That is, coordinates must be established in palm imprints finely and accurately.

Moreover, it is difficult to identify individual persons only with the few image parts because the same feature overlaps in many portions within the limited area which is thinly extracted. Consequently, a considerable number of image parts are necessary to obtain features from a palm print of the subject to be authenticated.

SUMMARY OF THE INVENTION

It is an object of the present invention to provide a method and device for identifying and collating individuals with palm prints easily and quickly with a reduced amount of data necessary for the collating.

In a method of registering palm imprints in accordance with the present invention, each palm imprint obtained from individuals to be identified is divided into plural parts or regions having predetermined positions and sizes when the palm imprints are registered for the authentication of the individuals. Feature points are extracted from the palm imprint parts and registered as information (hereinafter often referred to as "feature information") about the feature points.

A device for registering a palm imprint in accordance with the present invention comprises an image display unit for displaying the palm imprint as image information on a display unit, a partial division unit for dividing the palm imprint into plural parts of regions having predetermined sizes and locations, a feature extraction unit for extracting feature points from the ranges of the image parts, and a data memory unit. Part information about the image parts and the feature information extracted by the feature extraction unit are correlated and stored in the data memory unit, together with corresponding information about the individual entered separately.

In this device, the palm imprint is divided into ranges having predetermined sizes and locations for authentication of individuals. This facilitates the discrimination and the identification of the individuals. The individuals can also be authenticated. In addition, the amount of data transmitted to and from the data memory unit can be reduced because the data is divided into parts.

In a method of collating a palm imprint in accordance with the invention, the feature points obtained from the palm imprint are registered corresponding to their respective image parts obtained by the registering method described above. When these feature points are compared against reference samples for authentication of the individual, he or she is authenticated if the feature information derived from at least one of the image parts makes a match.

A device for collating palm imprints of individuals in accordance with the invention comprises a data memory unit for storing part information about parts of each palm imprint and corresponding feature information about feature points as well as corresponding personal identity information for identification of the individuals, an image extraction unit for dividing each input palm print left behind and extracting at least one image part of the print, a feature extraction unit for extracting feature points from the image part or parts extracted by the image extraction unit, and an information collating unit for comparing the part information about the image parts and the feature information about the extracted feature points with data stored in the data memory unit and producing information that identifies verified individuals.

Where the collating is carried out by this device, feature information is extracted only from some image parts and used for the collating. This can reduce the amount of data transmitted to and from the data memory unit or the information collating unit. Moreover, the collating time can be shortened.

Other objects and features of the invention will appear in the course of the description thereof, which follows.

DESCRIPTION OF THE PREFERRED EMBODIMENTS

Figure 1:
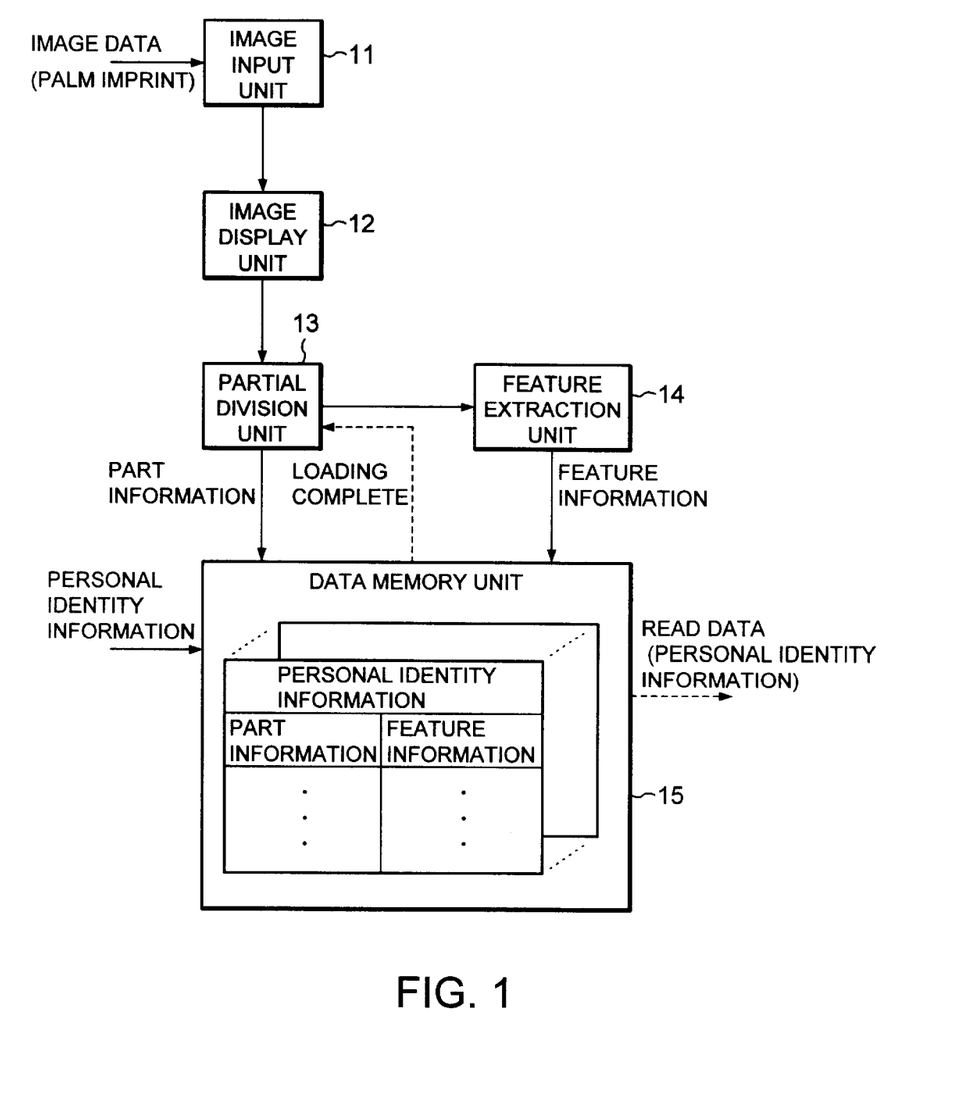
FIG. 1 is a functional block diagram of a device for registering palm imprints in accordance with the present invention.

FIG. 1 illustrates the functions of a device for registering palm prints in accordance with the present invention. This registration device comprises an image input unit 11, an image display unit 12, an partial division unit 13, a feature extraction unit 14, and a data memory unit 15.

The image input unit 11 accepts a palm imprint to be registered and stored. The input unit 11 sends the image data to the image display unit 12 to display the image on the viewing screen. The image display unit 12 receiving the image data displays the whole palm imprint and divides the displayed image into parts by predetermined division lines under manual control or computer control. Data about the specified division lines is sent to the partial division unit 13, which divides the images into parts. Ranges having appropriate size and positions enabling identification of individuals have been previously determined. A specific example of this will be described later with reference to FIG. 5.

The partial division unit 13 receives the image data from the image display unit 12 and is instructed how the image is divided by division lines.

The partial division unit 13 specifies image parts in a predetermined sequence and sends image data about the specified image parts to the feature extraction unit 14 and information about the specified part to the data memory unit 15. The supply of the data and information is stopped under control of the data memory unit 15. The information about the image parts may not be directly sent to the data memory unit 15; rather the information may be sent together with the image data via the feature extraction unit or other route.

The feature extraction unit 14 extracts feature points from the image data received from the partial division unit 13 and sends information about the feature points to the data memory unit 15. Where the information about the image parts is sent together with the image data from the partial division unit 13, the information about the image parts is also sent to the data memory unit 15 along with the information about the feature points.

The data memory unit 15 has memory regions for storing data. A different kind of information about individuals (e.g., personal names or individual identification codes) entered separately is stored in a different one of the memory regions. The data memory unit 15 receives the information about the feature points from the feature extraction unit 14 and loads the input feature information into the memory regions corresponding to those pieces of the image part information that are received at the same time.

The information for the identification of individuals entered separately is entered from the data memory unit. The information may be sent from the image input unit to the data memory unit together with the image data via various processing means or other route.

Figure 2:
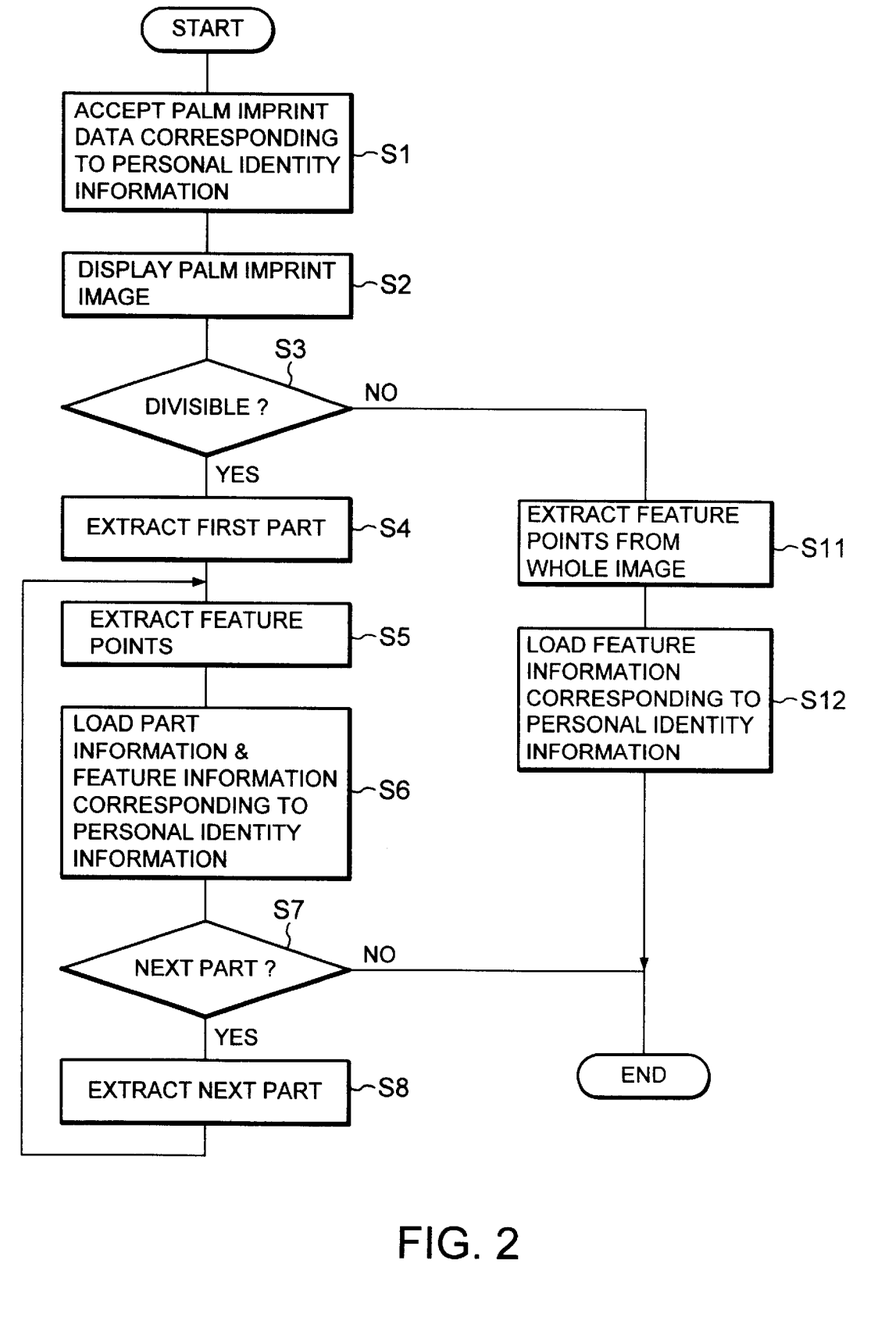
FIG. 2 is a flowchart illustrating a sequence of operations performed by the device shown in FIG. 1.

A sequence of operation for registration as shown in FIG. 1 is next described by referring to FIGS. 1 and 2. FIG. 2 is a flowchart illustrating a main sequence of operations performed by the palm print registration device shown in FIG. 1.

The various kinds of information are transmitted as shown in FIG. 1. First, an instruction for registering a palm imprint is entered into the registration device. Then, image data about the palm imprint is entered into the image input unit 11 (step S1). Personal identity information about the individual such as his or her name or an individual identification code is input into the data memory unit 15. The image data about the palm imprint entered into the image input unit 11 is displayed on the image display unit 12 (step 2).

A decision is made as to whether the image displayed on the image display unit 12 can be divided into predetermined parts (step 3). If the result of the decision made in step 3 is YES, control goes to step 4, where the image data is sent to the partial division unit 13 together with a Division instruction. The partial division unit 13 extracts the first one of the image parts produced by the division (step 4). Image data about the divided parts having predetermined regions is sent to the feature extraction unit 14. Names indicative of the divided parts are sent as part information to the data memory unit 15.

The feature extraction unit 14 receives the image data about the divided parts, extracts feature points (step 5), and sends them as feature information to the data memory unit 15. The data memory unit 15 loads the feature information about the feature points into those of the memory regions which correspond to the part information received simultaneously from the partial division unit 13 (step 6). As mentioned previously, the different memory regions are established for different kinds of information about individuals, the information being entered separately.

When the partial division unit 13 receives a notification of completion of the loading operation from the data memory unit 15, if no further image part exists (i.e., the result of the decision made in step 7 is NO), the processing is ended. If the result of the decision made in step 7 is YES, indicating that nay further image part exists, then this part is extracted (step 8). Control goes back to step 5, where feature points are extracted from the image data about the extracted part, and subsequent processing is repeated.

If the result of the decision made in step 3 is NO (i.e., the image data displayed on the image display unit 12 indicates that the desired part is indivisible, data about the whole displayed image is sent to the feature extraction unit 14 from the partial division unit 13. Information about the whole image is sent as an assemblage of data about the image parts to the data memory unit 15. Therefore, the feature extraction unit 14 receives the image data and extracts feature points from the whole image (step 11). The information about the feature points is sent as feature information to the data memory unit 15, which in turn loads the feature information sent from feature extraction unit 14 into those (not shown) of the regions corresponding to the information about the whole image (step 12). Then, the processing is ended.

A collating device for collating palm prints left behind is next described with reference to FIG. 3, which is a functional block diagram of the collating device. This collating device comprises a data memory unit 20, an image input unit 21, an image display unit 22, an partial division unit 23, a feature extraction unit 24, and an information collating unit 25.

A database of information about feature points corresponding to the information about the image parts has been previously stored in the data memory unit 20 for each piece of information identifying each individual as described above. Where there is a request for search for information about feature points according to information about one image part, the feature information about each kind of information on individuals is sequentially sent to the information collating unit 25 together with the information identifying the individual according to the received image part information under control of the information collating unit 25. Accordingly, the database can be constructed by an independent recording medium, e.g., a disk memory. Data registered on the registration device can be copied and supplied.

The image input unit 21 receives image data consisting of the palm imprint that is left behind and should be verified, and sends the image data to the image display unit 22. This display unit 22 receives the image data and displays the whole palm imprint on its viewing screen. The image on the screen is divided into parts by means of predetermined division lines under manual control or computer control. The specified division lines are sent to the partial division unit 23.

The partial division unit 23 divides the palm image left behind into plural parts, depending on the image data received from the image display unit 22 and on the specified division. If the image parts obtained by the division are plural, the partial division unit 23 specifies these parts in a predetermined order. Image data derived from these parts are sent to the feature extraction unit 24. Furthermore, information about the parts produced by the division is sent to the information collating unit 25. The supply of these image data and information about the parts is stopped or the destination of the supply is switched under control of the information collating unit 25. The information about the parts may be sent directly to the data memory unit, for example, without via the information collating unit.

The feature extraction unit 24 extracts feature points from the image data received from the partial division unit 23 and sends information about the feature points to the information collating unit 25. If the information about the image parts is sent together with the image data from the partial division unit 23, the information about the image parts is sent to the information collating unit 25 along with the information about the feature points.

The information collating unit 25 sends the part information received from the partial division unit 23 to the data memory unit 20. If there is a request for search for information about feature points, the collating unit 25 accepts the information about the feature points and the information to identify the individual from the data memory unit 20. The information about the feature points is based on image part information for each kind of personal identity information stored in the data memory unit 20. The data memory unit 20 is sequentially searched for the information about the individuals. Subsequently, the collating unit 25 compares the feature information about the feature points obtained from the feature extraction unit 24 against the information about the feature points in the data memory unit 20, the feature information being apart from the information received from the data memory unit 20. If there is a match between them, the collating unit 25 delivers the personal identity information to identify the individual, the personal identity information being received from the data memory unit 20.

Figure 3:
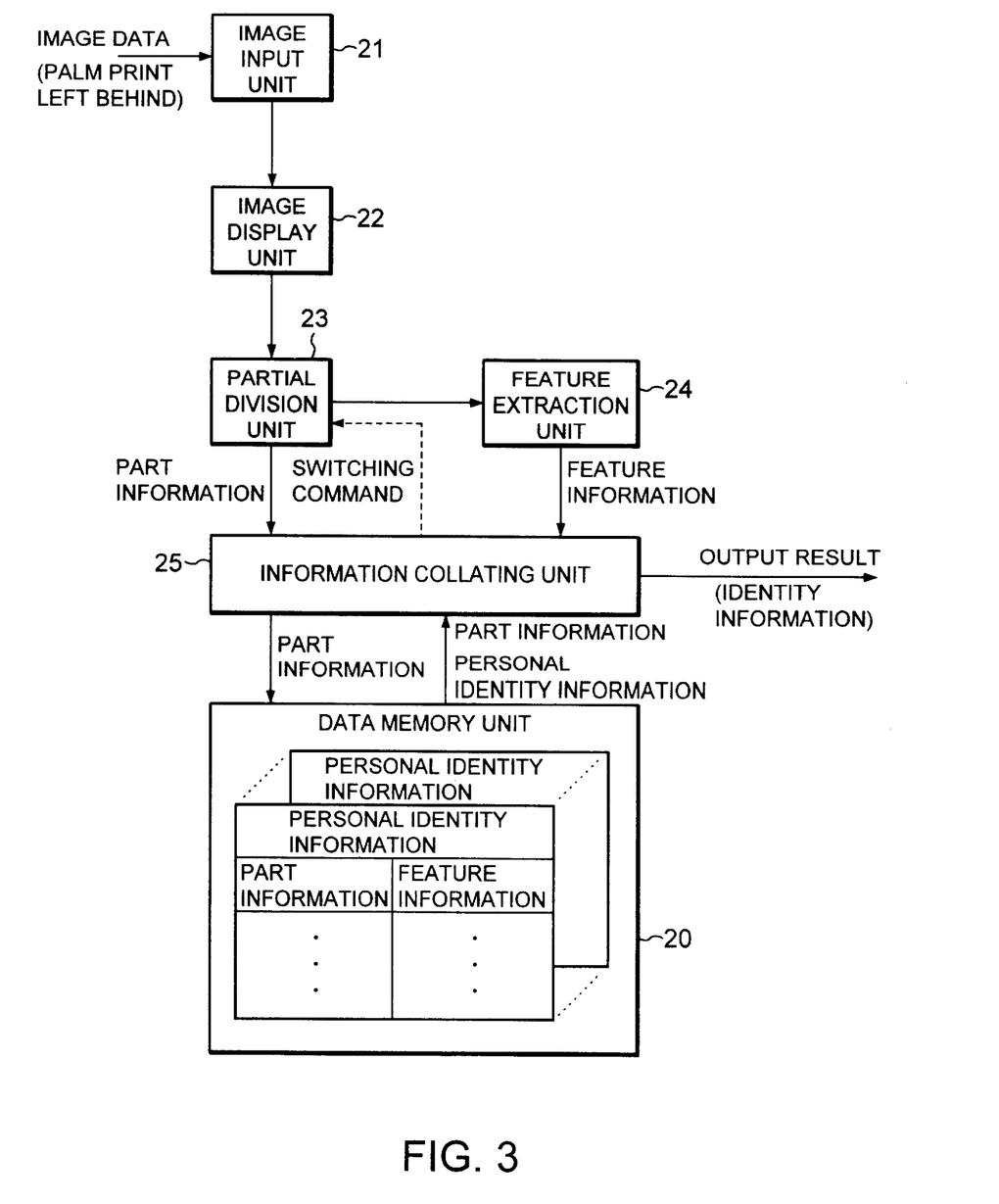
FIG. 3 is a functional block diagram of a collating device for collating palm prints left behind, the collating device being built in accordance with the invention.
Figure 4:
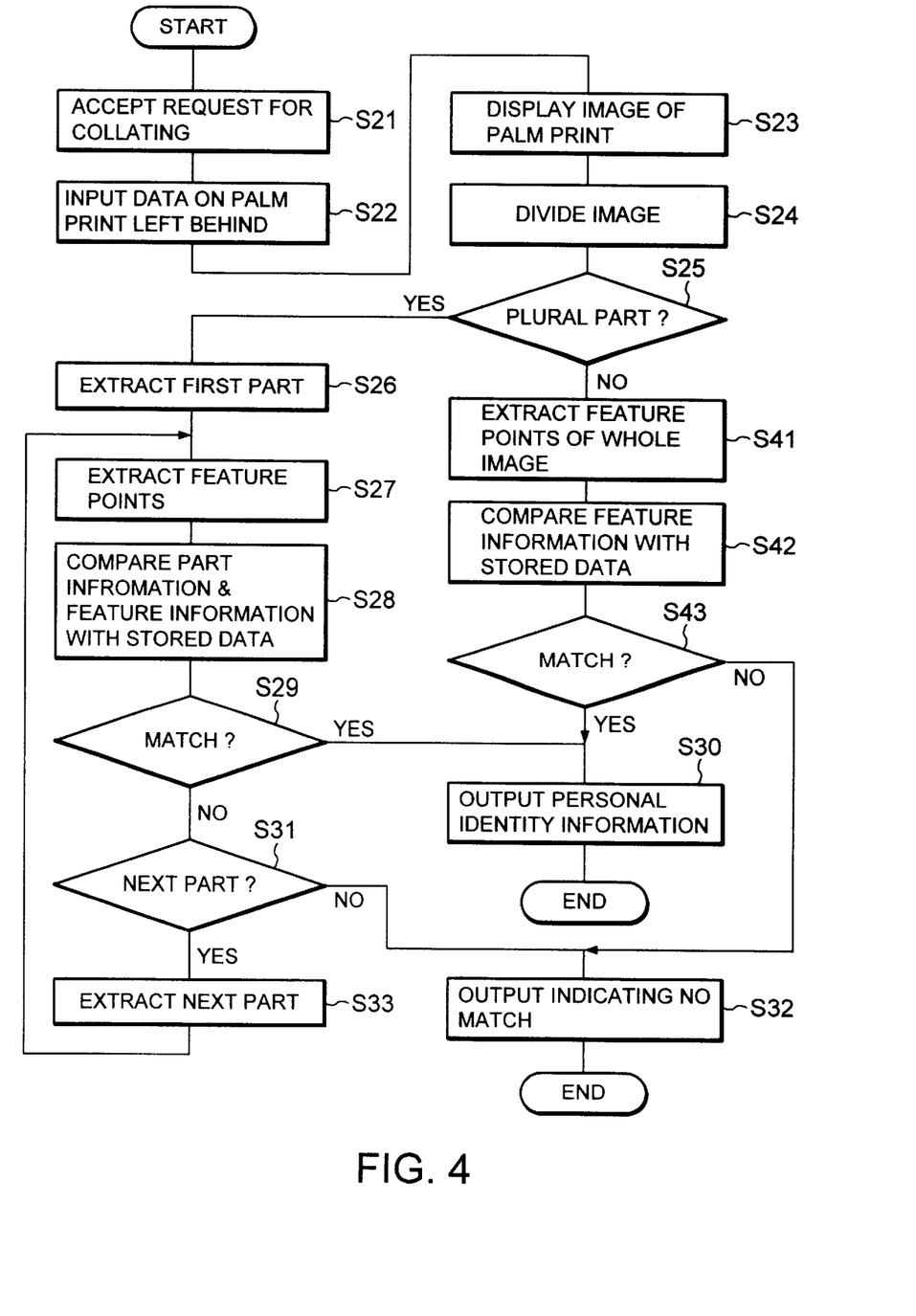
FIG. 4 is a flowchart illustrating a main sequence of operations performed by the device shown in FIG. 3.

Operations for collating are shown in FIG. 3. These operations are described in further detail by referring to FIGS. 3 and 4. FIG. 4 is a flowchart illustrating a main sequence of operations performed by the collating device shown in FIG. 3, the collating device acting to collate palm prints left behind. Various kinds of information are transmitted as shown in FIG. 3.

The collating device receives a collating request for collating a palm print left behind (step 21) and image data about the palm print left behind (step 22). The image display unit 22 displays an image according to the received image data (step 23).

The partial division unit 23 divides the image displayed on the image display unit 22 into predetermined parts and makes a decision as to whether the displayed image has plural parts (step 24). If the result of the decision made in step 24 is YES, control goes to step 25, where a decision is made as to whether the displayed image is divided into plural parts. If the result of the decision made in step 25 is YES, control goes to step 26, where the first image part is extracted (step 26). The partial division unit 23 sends image data corresponding to the divided parts to the feature extraction unit 24 and gives names to the divided parts. These names are sent as information about the parts of the image to the information collating unit 25.

The feature extraction unit 24 receives image data about the divided parts having desired regions and extracts feature points (step 27). Information about the feature points is sent from the extraction unit 24 to the information collating unit 25, which in turn sends the information about the feature points to the data memory unit 20.

The data memory unit 20 searches for information about the feature points of individuals using the part information received from the information collating unit 25. The information about the feature points from each individual is sequentially sent to the collating unit 25 along with the information to identify the individuals. The collating unit 25 compares the feature information received from the feature extraction unit 24 against the feature information in the data memory unit 20 (step 28). Control then proceeds to step 29, where a decision is made as to whether there is a match between these two kinds of feature information. If the result of the decision is YES, the collating unit 25 sends out the personal identity information received from the data memory unit 20 (step 30).

If the result of the decision made in step 29 is NO, i.e., there is no match, control goes to step 31, where a decision is made as to whether information about the next extracted part is not available. If the result of the decision made in step 31 is NO, the collating unit 25 produces a collating output indicating that there is no match or no information (step 32).

If the result of the decision made in step 31 is YES, i.e., there is information about the next part of the image, control goes to step 33, in which the next part is extracted. Then, control goes back to step 27, where feature points are extracted from image data about the extracted part having predetermined regions. Subsequent processing is repeated.

If the result of the decision made in step 25 is NO, i.e., the desired part of the image data displayed on the image display unit 22 cannot be divided and there is only one part, the partial division unit 23 sends data about the whole displayed image to the feature extraction unit 24. The division unit 23 sends information about the whole image consisting of an assemblage of data about parts to the collating unit 25. The feature extraction unit 24 receives the data about the image and extracts feature points from the whole image (step 41). The feature points of the whole image are sent as information about the feature points of the palm print left behind to the collating unit 25.

The information collating unit 25 sends the feature information received from the feature extraction unit 24 to the data memory unit 20. The data memory unit 20 searches for the information about the feature points for each individual using the information received from the collating unit 25, the latter information being regarding the whole image. The searched information is sequentially sent to the collating unit 25 together with the personal identity information. The collating unit 25 compares the feature information received from the feature extraction unit 24 with the feature information stored in the data memory unit 20 (step 42). If the result of the decision made in step 43 is YES, i.e., there is a match, control goes to step 30, where the collating unit 25 produces an output that is the personal identity information received from the data memory unit 20.

If the result of the decision made in step 43 is NO, i.e., there is no match, control proceeds to step 32, where the collating unit 25 produces an output indicating that there is no match or no information.

Figure 5:
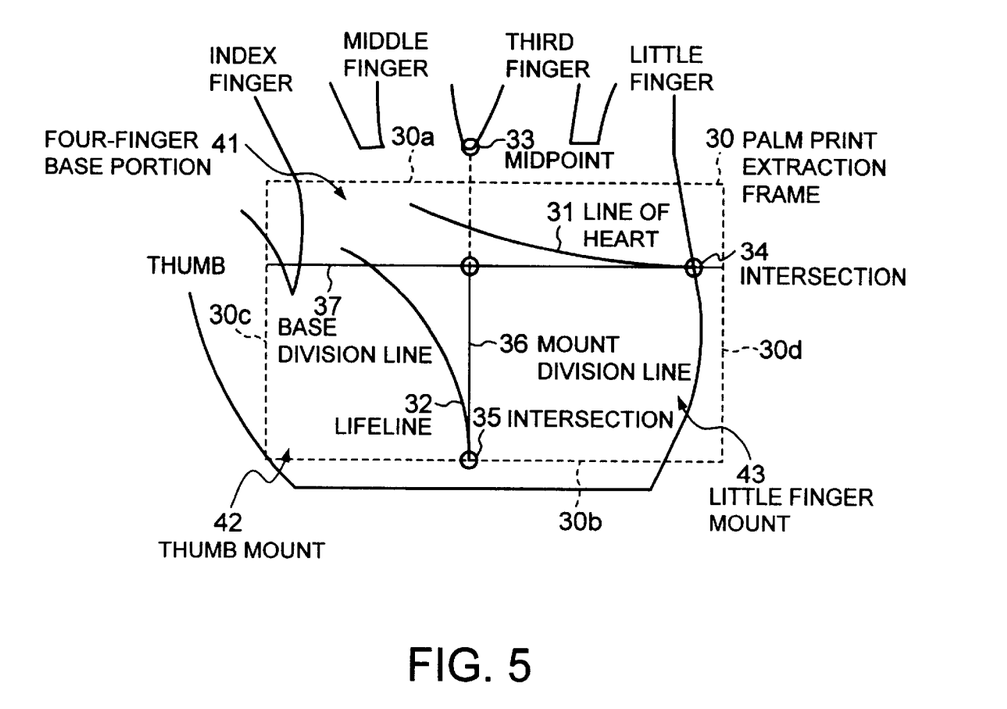
FIG. 5 is a view showing a manner in which image parts of a palm print are specified in accordance with the invention.

A palm imprint and a method of extracting parts of the palm imprint by division in accordance with the present invention are described by referring to FIG. 5. First, a palm imprint is almost wholly established as a rectangular extraction frame 30 to extract parts of the palm imprint. This frame 30 comprises an upper horizontal line 30a crossing the palm near the bases of the four fingers (i.e., index finger, middle finger, third finger, and little finger), a lower horizontal line 30b parallel to the upper horizontal line 30a and close to the wrist, a vertical straight line 30c vertical to the two horizontal lines 30a and 30b and close to the base of the thumb, and another vertical line 30d extending along the side surface under the little finger. The lower horizontal line 30b is so adjusted as to pass across an interunit 35 at which a Mount division line 36 meets the lifeline 32. The Mount division line 36 extends vertically from the midpoint 33 (specified later) between the base of the middle finger and the base of the third finger toward the wrist.

Everyone has these four fingers, a line of Heart 31, and a lifeline 32 in the palm print. Based on their positions, the midpoint 33, an interunit 34, and the interunit 35 are established as shown. As mentioned previously, the midpoint 33 is the midpoint in the connection unit that connects the middle finger and the their finger. At the interunit 34, the line of Heart 31 meets the side of the palm imprint under the little finger. As described above, at the interunit 35, the lifeline 32 on the wrist side meets the lower horizontal line 30b on the wrist side of the palm imprint.

To divide the palm imprint into parts, the Mount division line 36 and a base division line 37 are provided. The Mount division line 36 is a straight line connecting the midpoint 33 and the interunit 35. The base division line 37 extends from the interunit 34 vertically to the Mount division line 36.

The palm imprint further includes a four-finger base portion 41, a thumb Mount (fleshy lump) 42, and a little finger Mount 43. The four-finger base portion 41 is a region on the side of the four fingers and defined by the base division line 37 of the rectangular extraction frame 30. The thumb Mount 42 and the little finger Mount 43 are defined and partitioned by the base division line 37 of the extraction frame 30 and the Mount division line 36 and located closer to the thumb and to the little finger, respectively.

Figure 6:
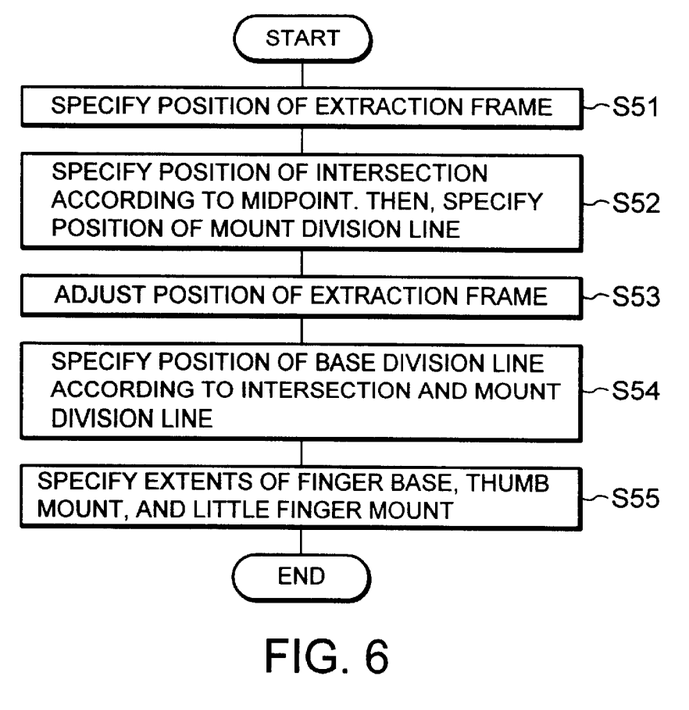
FIG. 6 is a flowchart illustrating a sequence of operations performed to specify the image parts as shown in FIG. 5.

The sequence in which the scopes of the four-finger base portion 41, the thumb Mount 42, and the little finger Mount 43 are set is next described by referring to FIGS. 5 and 6. First, the position of the palm imprint extraction frame 30 is specified by the upper horizontal line 30a crossing the palm near the bases of the four fingers, the lower horizontal line 30b close to the wrist, the vertical line 30c close to the base of the thumb, and the vertical line 30d extending along the side surface under the little finger (step 51).

Then, the position of the interunit 35 is set by the interunit of the vertical line 36 and the lifeline 32. The vertical line 36 extends vertically to the palm imprint extraction frame 30 from the midpoint 33 near the bases of the four fingers toward the wrist. As a result, a straight line passing across both midpoint 33 and interunit 35 is defined to be the Mount division line 36 (step 52).

Thereafter, the position of the portion of the extraction frame 30 on the wrist side is so adjusted as to pass across this interunit 35 (step 53).

Subsequently, the position of the interunit 34 is set by the interunit of the line of Heart 31 and the sideline of the palm imprint under the little finger. A straight line extending from the interunit 34 vertically to the Mount division line 36 is defined to be the base division line 37 (step 54).

Then, the inside of the extraction frame 30 is divided into vertically adjacent two parts by the base division line 37. That of these two parts which is closer to the four fingers is defined to be the four-finger base portion 41. That part of the inside of the extraction frame 30 that is defined by the base division line 37 and the Mount division line 36 and located close to the thumb is defined to be the thumb Mount 42. That part of the inside of the extraction frame 30 that is defined by the base division line 37 and the Mount division line 36 and located close to the little finger is defined to be the little finger Mount 43 (step 55). Then, the processing is ended.

Figure 7:
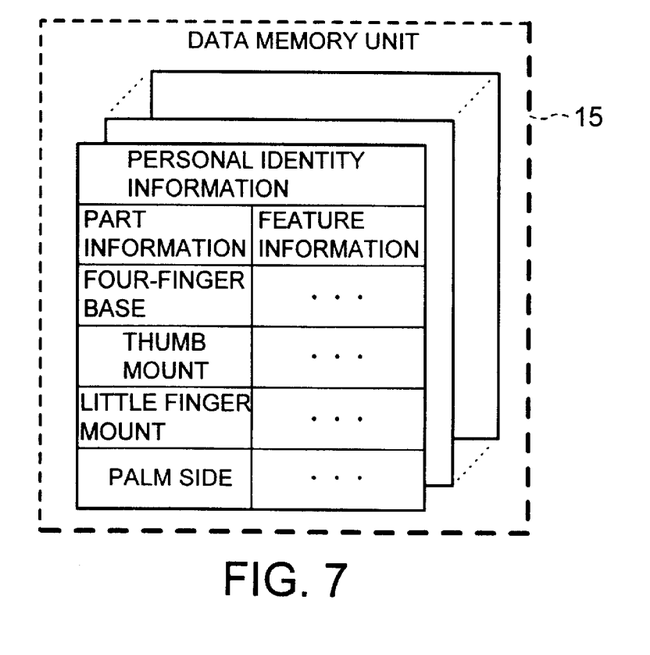
FIG. 7 is a block diagram illustrating one form of data stored in a device in accordance with the invention.

Personal identity information to identify each individual is stored in the manner as illustrated in FIGS. 1, 5, and 7. FIG. 7 illustrates one example of the personal identity information stored in the data memory unit 15 shown in FIG. 1.

This personal identity information includes feature points extracted from the four-finger base portion 41, the thumb Mount 42, and the little finger Mount 43 by the feature extraction unit 14, as well as palm prints on the side surfaces (not shown) of the palm. This information for identification of individuals is stored in the data memory unit 15.

Figure 8:
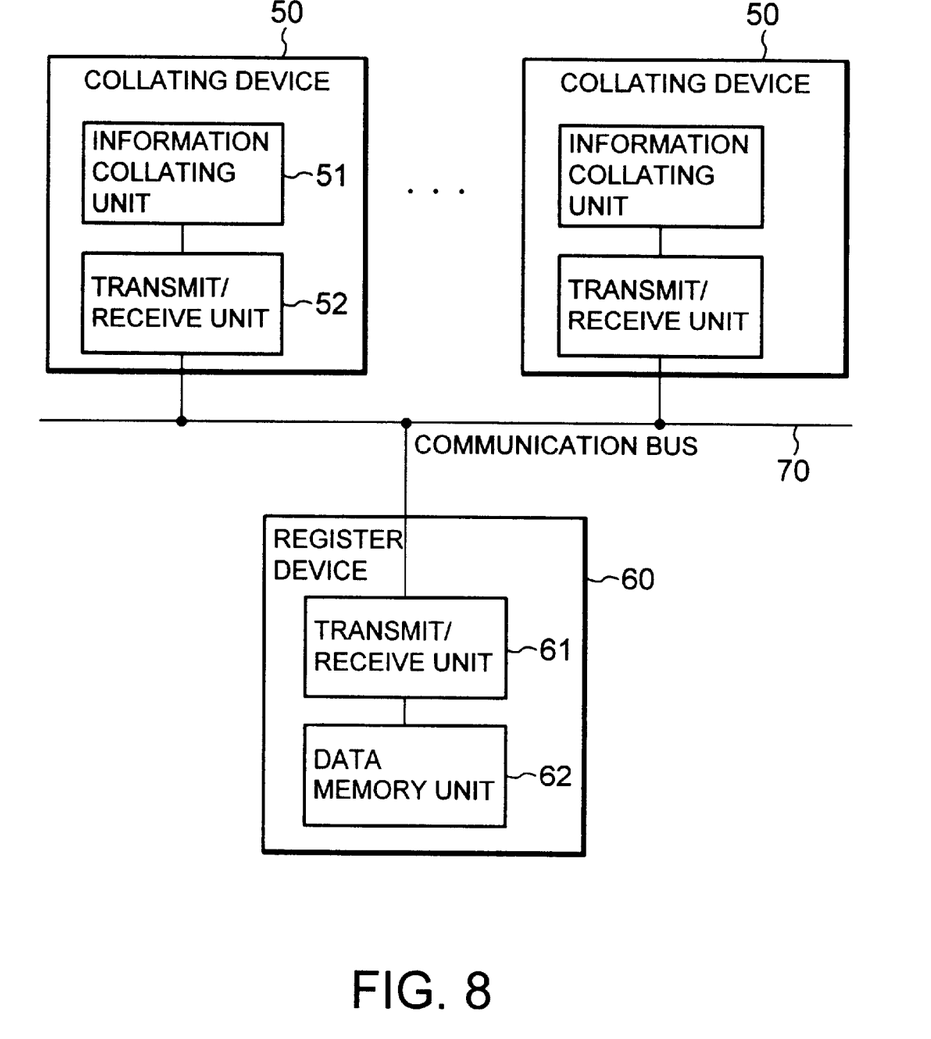
FIG. 8 is a block diagram of a device using a communications bus, the device being built in accordance with the invention.

A plurality of collating devices 50 and a registration device 60 are installed remotely. The collating devices 50 exchange data with the registration device 60 via a communications bus 70 in the manner as illustrated in FIGS. 1, 3, and 8.

Each collating device 50 does not have any data memory like the data memory unit 20 shown in FIG. 3. Each collating device 50 has an information collating unit 51 and a transmit/receive unit 52 interfaced to a data memory unit 62 inside the outside registration device 60 via the communications bus 70. The transmit/receive unit 52 receives information from the data memory unit 62 via a transmit/receive unit 61 inside the registration device 60. Personal identity information for identification of individuals as described above has been previously loaded in the data memory unit 62 of the registration device 60. That is, the data memory unit 62 inside the registration device 60 manages all the information for identification of all the individuals.

Figure 9:
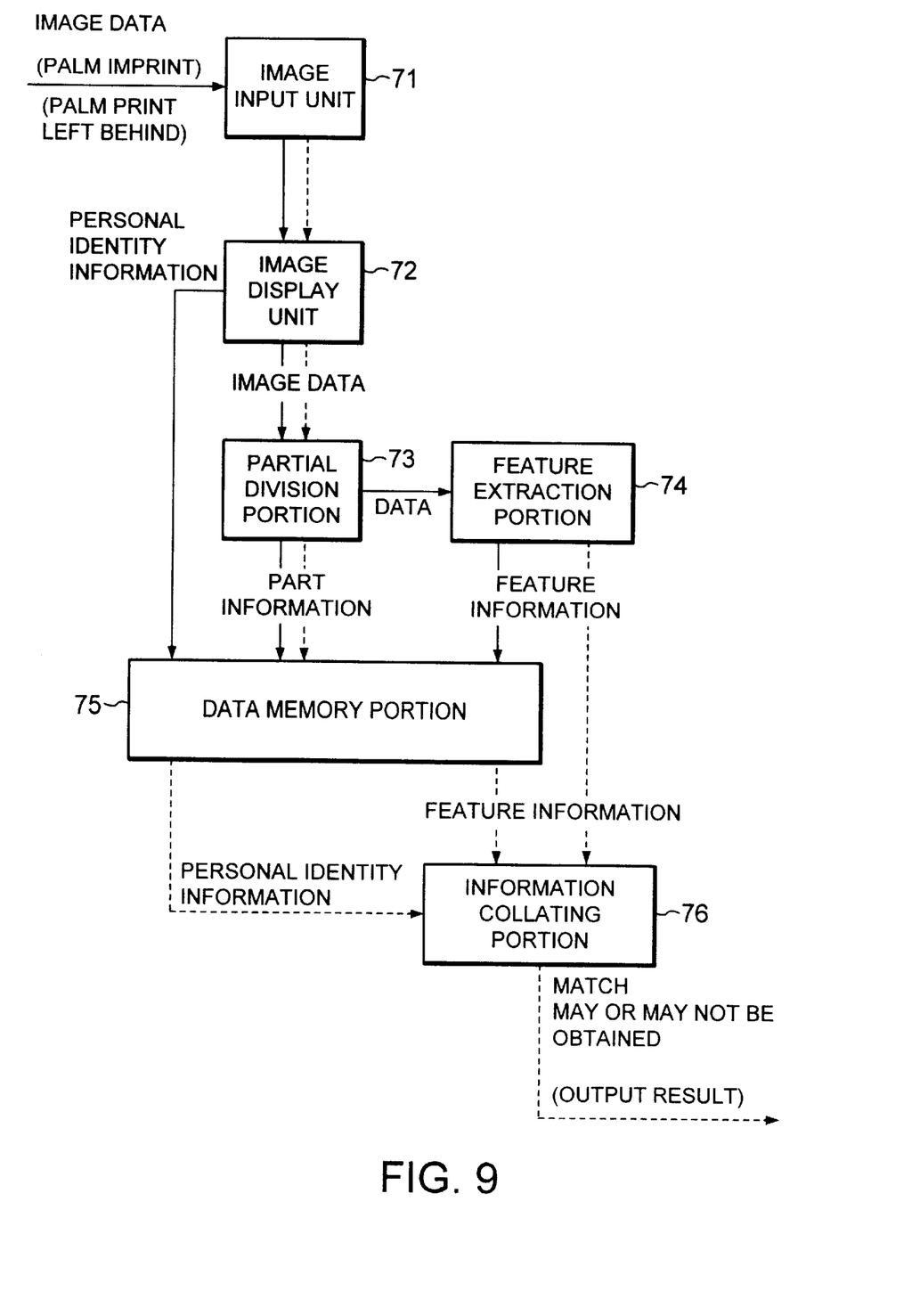
FIG. 9 is a functional block diagram of an integrated registration/collating device in accordance with the invention.

A registration/collating device in accordance with the present invention is next described by referring to FIG. 9. This integrated device comprises an image input unit 71, an image display unit 72, an partial division unit 73, a feature extraction unit 74, a data memory unit 75, and an information collating unit 76. This device is identical in the registering functions and operation with the device described already in connection with FIGS. 1 and 2. The integrated device is identical in the collating functions and operation with the device described previously in connection with FIGS. 3 and 4. Like components are indicated by like reference numerals in various figures and those components which have been already will not be described in detail below.

When a palm imprint is registered, information for identity of individuals is input to the data memory unit 75 from the image display unit 72. Part information about parts of the palm imprint is input from the partial division unit 73. Feature information about feature points is input from the feature extraction unit 74. These inputs are indicated by the solid lines. These various kinds of information are stored in the data memory unit 75.

When a palm imprint left behind is verified, the data memory unit 75 produces information for identify of individuals and information about feature points according to the part information received from the partial division unit 73. These outputs are indicated by the broken lines. The collating unit 76 compares the feature information received from the feature extraction unit 74 with the feature information stored in the data memory unit 75. The results are output together with the personal identity information received from the data memory unit 75.

In the description given above, the functions and the sequence of operations are illustrated. The functions may be combined or separated at will using arbitrary functional blocks. Furthermore, the sequence may be modified arbitrarily as long as the functions are satisfied. It is to be noted that the description provided above does not limit the scope of the present invention.

As described thus far, the present invention divides a palm print into image parts having predetermined positions and sizes. Feature points are extracted from the regions of these image parts. In particular, the palm print is divided into a four-finger base portion, a thumb Mount, and a little finger Mount by Mount division lines and base division lines. This facilitates identifying individuals.

Moreover, data sent to and from the data memory unit is divided into plural parts and so the amount of data transmitted can be reduced. This shortens the collating time until authentication is completed and thus the collating can be performed quickly. The amount of data stored for collating can be decreased. During collating, feature points are derived only from some parts of the palm image and compared with a stored templates. Hence, individuals can be identified with a reduced amount of data.

What is claimed is:

1. A method of registering a palm imprint of an individual to be identified to authenticate the individual, said method comprising the steps of:

dividing said palm imprint into plural image parts having regions having predetermined positions and sizes;

extracting feature points from said image parts; and registering said feature points as information for identification of the individual, wherein said step of dividing said palm imprint into said plural image parts is done using division lines that are established with respect to fingers of said palm imprint and positions of a heart line and a lifeline of the palm imprint.

2. A method of collating a palm imprint, comprising the steps of:

registering palm imprints by the method of claim 1 such that each palm imprint is divided into plural image parts and that feature points derived from the image parts are registered;

obtaining a palm imprint from an individual as an input palm imprint;

dividing said input palm imprint into said parts;

extracting feature points from at least one of said image parts of said input palm imprint;

comparing said extracted feature points with the previously registered feature points; and authenticating said individual if there is a match between the feature points compared.

3. A method of collating a palm imprint as set forth in claim 2, wherein said step of dividing said input palm imprint into said plural image parts is done using division lines that are established with respect to fingers of said input palm imprint and positions of a heart line and a lifeline of the input palm imprint.

4. A method of collating a palm imprint as set forth in claim 2, wherein said plural image parts of said palm imprint includes at least a four-finger base portion close to the bases of the four finger of said individual, a thumb mount close to the base of the thumb, and a little finger mount occupying a remaining region, and wherein said step of dividing said palm imprint is done using a mount division line and a base division line, said mount division line connecting a midpoint between a middle finger and a third finger with a first intersection at which the lifeline on the wrist side meets a straight line on the wrist side, said base division line extending from a second intersection perpendicularly to said mount division line, said second intersection being a point at which the heart line meets a side surface under the little finger.

5. A method of collating a palm imprint as set forth in claim 4, wherein said information to identify the individual includes second feature points derived from various portions of the palm imprint when the palm imprint is not divided, in addition to feature points of the separate parts of the palm imprint.

6. A method of collating a palm imprint as set forth in claim 4, wherein said information to identify the individual includes second feature points derived from various portions of the palm imprint when the palm imprint is not divided and features points of a side surface of the palm, in addition to feature points of the separate parts of the palm imprint.

7. A method of registering a palm imprint as set forth in claim 1, wherein said plural image parts of said palm imprint includes at least a four-finger base portion close to the bases of the four fingers of said individual, a thumb mount close to the base of the thumb, and a little finger mount occupying a remaining region, and wherein said step of dividing said palm imprint is done using a mount division line and a base division line, said mount division line connecting a midpoint between a middle finger and a third finger with a first intersection at which the lifeline on the wrist side meets a straight line on the wrist side, said base division line extending from a second intersection perpendicularly to said mount division line, said second intersection being a point at which the heart line meets a side surface under the little finger.

8. A method of registering a palm imprint as set forth in claim 7, wherein said information to identify the individual includes second feature points derived from various portions of the palm imprint when the palm imprint is not divided, in addition to feature points of the separate parts of the palm imprint.

9. A method of registering a palm imprint as set forth in claim 7, wherein said information to identify the individual includes second feature points derived from various portions of the palm imprint when the palm imprint is not divided and features points of a side surface of the palm, in addition to feature points of the separate parts of the palm imprint.

10. A device for registering a palm imprint of an individual to be identified to authenticate the individual, said device comprising:
a first image display unit for displaying said palm imprint as image information;
a first partial division unit for dividing said palm imprint into plural parts having regions represented by predetermined positions and sizes;
a first feature extraction unit for extracting feature points of said parts of said palm imprint; and
registration data memory unit for storing part information about said parts of said palm imprint, feature information about said feature points, and personal identity information for identity of individuals in a correlated manner, said personal identity information being entered separately,
wherein said partial division unit divides said palm imprint into said plural parts according to division lines that are established with respect to fingers of said palm imprint and positions of a heart line and a lifeline of the palm imprint.

11. A device for registering a palm imprint as set forth in claim 10, wherein said first image display unit displays the whole palm imprint formed by impressing a palm.

12. A device for registering a palm imprint as set forth in claim 10, wherein said data memory unit has a communications means and searches for various kinds of information stored therein and sends out the searched information through a communications bus according to requests from external devices.

13. A collating device for comparing an input palm print left behind with palm prints registered by the registration device of claim 10 to authenticate individuals, said collating device comprising:
a second image display unit for displaying said input palm print left behind as image information;
a collating data memory unit for storing the feature information in said registration data memory unit intact;
a second partial division unit for dividing the input palm print left behind into plural parts having regions represented by predetermined positions and sizes;
a second feature extraction unit for extracting information about feature points of said parts of the palm print; and
information collating unit for comparing the feature information about said parts of the input palm print with the feature information stored in said collating data memory unit and producing information for identification of the individual if there is a match between them.

14. An integrated registration/collating device, wherein the registration device and the collating device of claim 13 are combined into a unit, and wherein said registration device and said collating device have said image display unit, said partial division unit, said feature extraction unit, and said data memory unit in common such that said registration device and said collating device share the same functions.

15. The integrated registration/collating device of claim 14, wherein said input palm print is divided according to division lines that are established with respect to fingers of said input palm imprint and positions of a heart line and lifeline of the input palm imprint.

16. The integrated registration/collating device of claim 15, wherein said plural regions of said palm print include at least a four-finger base portion close to the bases of the four fingers of said individual, a thumb mount close to the base of the thumb, and a little finger mount occupying a remaining region, and wherein said step of dividing said palm imprint is done using a mount division line and a base division line, said mount division line connecting a midpoint between a middle finger and a third finger with a first intersection at which the lifeline on the wrist side meets a straight line on the wrist side, said base portion division line extending from a second intersection perpendicularly to said mount division line, said second intersection being a point at which the heart line meets a side surface under the little finger.

17. The integrated registration/collating device of claim 14, wherein said plural regions of said palm print include at least a four-finger base portion close to the bases of the four fingers of said individual, a thumb mount close to the base of the thumb, and a little finger mount occupying a remaining region, and wherein said step of dividing said palm imprint is done using a mount division line and a base division line, said mount division line connecting a midpoint between a middle finger and a third finger with a first intersection at which the lifeline on the wrist side meets a straight line on the wrist side, said base portion division line extending from a second intersection perpendicularly to said mount division line, said second intersection being a point at which the heart line meets a side surface under the little finger.

18. The integrated registration/collating device of claim 17, wherein said information to identify the individual includes second feature points derived from various portions of the palm imprint when the palm imprint is not divided, in addition to feature points of the separate parts of the palm imprint.

19. The integrated registration/collating device of claim 17, wherein said information to identify the individual includes second feature points derived from various portions of the palm imprint when the palm imprint is not divided and feature points of a side surface of the palm, in addition to feature points of the separate parts of the palm imprint.

20. A collating device for comparing an input palm print left behind with palm prints registered by the registration device of claim 10 to authenticate individuals, said collating device comprising:
a second image display unit for displaying said input palm print left behind as image information on a viewing screen;
a second partial division unit for dividing the input palm print left behind into plural parts having regions represented by predetermined positions and sizes;
a second feature extraction unit for extracting information about feature points of said parts of the palm print; and
information collating unit for comparing the feature information about said parts of the palm print with the feature information about said palm print stored in said registration data memory unit and producing information for identity of the individual if there is a match between them.

* * * * *